United States Patent
Johnson et al.

(10) Patent No.: US 6,518,994 B1
(45) Date of Patent: Feb. 11, 2003

(54) VIDEO CALL DISTRIBUTION

(75) Inventors: James V. Johnson, Kettering, OH (US); Alfredo Rizo-Patron, Waynesville, OH (US); John G. Mitzka, West Chester, OH (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/014,474

(22) Filed: Jan. 28, 1998

(51) Int. Cl.[7] .................................................. H04N 7/14
(52) U.S. Cl. ................................. 348/14.11; 348/14.08; 379/265.02
(58) Field of Search .......................... 379/93.01, 93.12, 379/93.14, 93.17, 93.25, 202, 265–266, 309, 93.07, 201, 90.01, 93.21; 348/14–15, 17; 370/260–263, 401; 345/330–332; 709/204; 705/26, 35, 43

(56) References Cited

U.S. PATENT DOCUMENTS

| | | | | |
|---|---|---|---|---|
| 4,654,866 A | * | 3/1987 | Bottle et al. | 348/14.11 |
| 5,329,572 A | * | 7/1994 | Martens | 348/16 |
| 5,371,534 A | * | 12/1994 | Dagdeviren et al. | 348/14.01 |
| 5,557,667 A | * | 9/1996 | Bruno et al. | 348/14 |
| 5,563,937 A | * | 10/1996 | Bruno et al. | 379/201 |
| 5,604,341 A | | 2/1997 | Grossie et al. | 348/15 |
| 5,608,872 A | | 3/1997 | Schwartz et al. | 345/330 |
| 5,661,283 A | * | 8/1997 | Gallacher et al. | 348/15 |
| 5,717,857 A | * | 2/1998 | Burkman et al. | 345/331 |
| 5,774,663 A | * | 6/1998 | Randle et al. | 709/204 |
| 5,838,682 A | * | 11/1998 | Dekelbaum et al. | 379/93.07 |
| 5,894,512 A | * | 4/1999 | Zenner | 379/265 |
| 5,929,897 A | * | 7/1999 | Schneider et al. | 348/15 |
| 6,148,072 A | * | 11/2000 | Huang | 348/14.12 |

OTHER PUBLICATIONS

U.S. Patent Application Ser. No. 08/501,686, filed Jul. 12, 1995, entitled Automated Distribution of Video Telephone Calls, by inventors K. Gallacher et al., assigned to NCR Corporation. PN. 5,929,897.

* cited by examiner

Primary Examiner—Curtis Kuntz
Assistant Examiner—George Eng
(74) Attorney, Agent, or Firm—Gregory A. Welte

(57) ABSTRACT

A system for routing incoming video calls. A group of agents handle incoming calls, as in a telephone mail order facility. When a server receives an incoming video call, it selects an available agent, and tells the selected agent to expect the call. The server does not physically route the call to the selected agent. Instead, the server informs the calling party of the identity of the selected agent. The calling party then places a video call to the selected agent, using another communication channel. This process enables ordinary call routing systems to, in effect, route video calls, which ordinarily requires a routing apparatus which is quite expensive.

14 Claims, 6 Drawing Sheets

FIG. 3
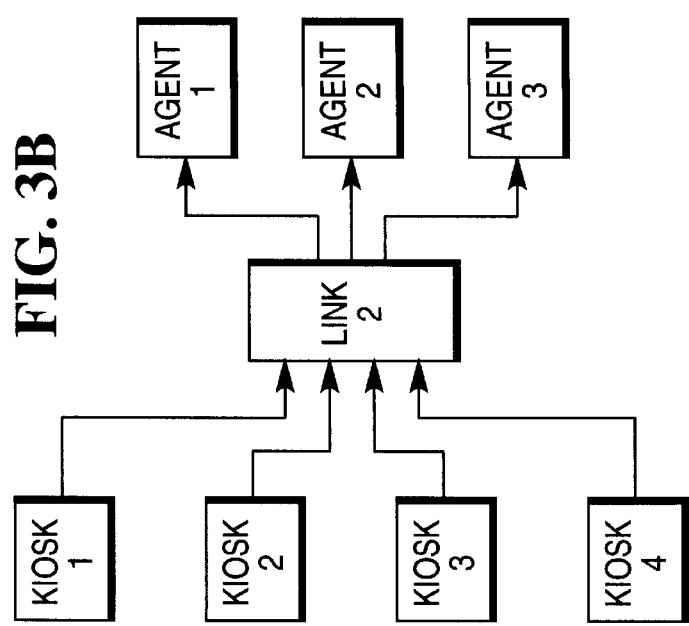
FIG. 3B
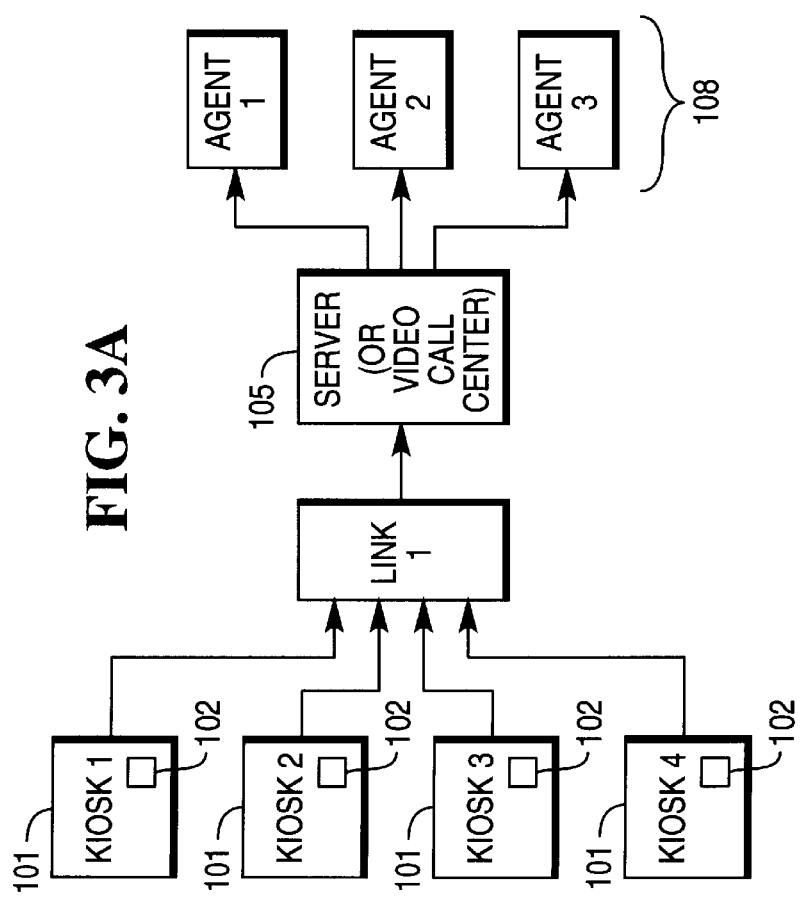
FIG. 3A

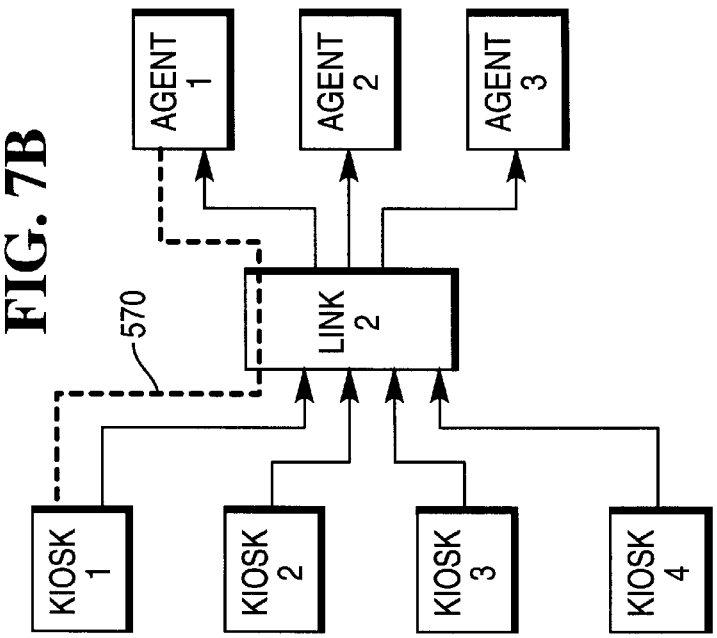
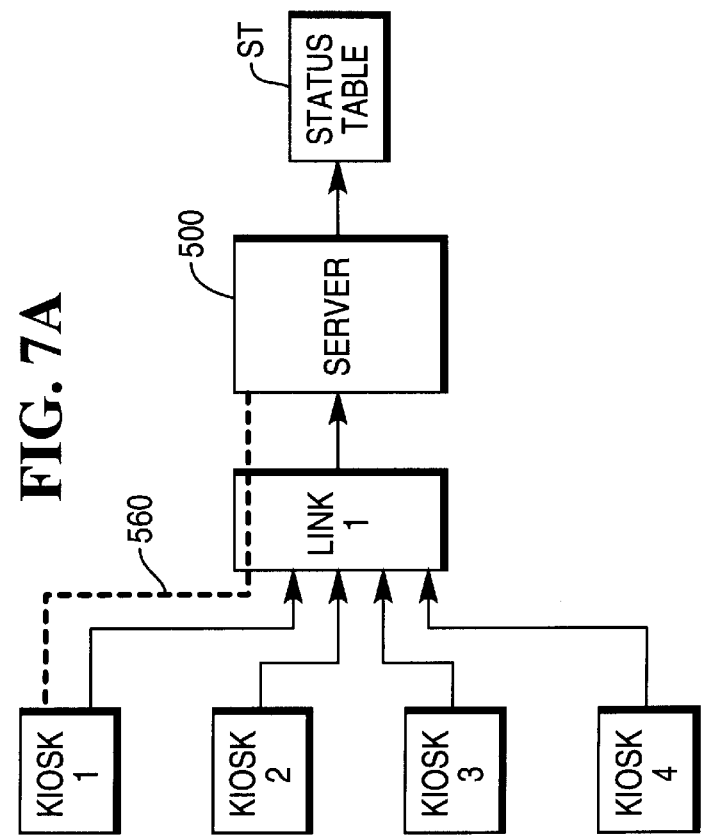
FIG. 7
FIG. 7A
FIG. 7B

VIDEO CALL DISTRIBUTION

The invention concerns a system for distribution of incoming video conference calls to selected recipients.

BACKGROUND OF THE INVENTION

FIG. 1 illustrates a telephone call center 12, in which a routing system 3 receives incoming calls from the public telephone network 6, or other type of network.

The routing system 3 examines the status of agents 9, locates an available agent, and routes the incoming call to that agent. The routing system is also called an ACD, which is an acronym for Automated Call Distribution system. The agents can take the form of people, as illustrated, or automated voice response systems, or other call-handling apparatus.

"Call center" is a term-of-art. Call centers are commercially available, and one example is that sold under the name DEFINITY Enterprise Communication Server, manufactured by Lucent Technologies Inc. Call centers are frequently used, for example, by telephone merchandising organizations.

The calls just discussed are audio calls. Another type of call, namely, the video call, is coming into widespread use. However, ordinary call centers do not handle video calls, and cannot route such calls to agents. Other types of call centers, known as video ACDs, have become available which do route video calls. One type of video ACD is the Multimedia Automated Call Distribution (MACD), available from PictureTel Corporation, located in Andover, Massachusetts.

However, video ACD's are somewhat expensive. Consequently, replacement of an ordinary ACD by a video ACD requires a significant capital investment. Further, video ACDs necessarily have a limited bandwidth: they can handle only a limited number of video calls.

OBJECTS OF THE INVENTION

An object of the invention is to provide a system for distributing video conferencing calls.

A further object of the invention is to provide a system for distributing video conferencing calls which can be retrofitted to existing ACDs, or existing computer networks.

A further object of the invention is to provide a system for distributing video conferencing calls which has no significant bandwidth limitation.

SUMMARY OF THE INVENTION

In one form of the invention, a remote computer calls a server, requesting a video conference with an agent. The server selects an agent to participate in the video conference, identifies the selected agent to the computer, and notifies the selected agent of the forthcoming call. The computer then places a second call, which is a video call and is independent of the initial call, directly to the selected agent, without involvement of the server.

BRIEF DESCRIPTION OF THE DRAWINGS

FIGS. 3A and 3B illustrate two modes of operation of the invention. In FIG. 3A, one or more kiosks 101, or end points, contacts a server 105, using LINK 1. The server 105 relays data to one of the agents 108. In FIG. 3B, one or more kiosks 101 contact a respective agent directly through LINK 2, without intervention of server 105.

FIG. 7A illustrates consultation of a status table by server 500. FIG. 7B illustrates a direct connection between KIOSK 1 and AGENT 1, through LINK 2.

DETAILED DESCRIPTION OF THE INVENTION

Overview

In one form of the invention, agents use computers to hold video conferences. The computers are linked together on a network. The network is not used to support the video conferences, but is only used in a limited distribution function, and to handle other overhead tasks.

A server linked to the network accepts requests for video conferences from outside parties. When a request arrives, the server selects an agent to handle the video conference requested, and also performs two types of notification. One, it notifies the requesting party of the identity of the agent selected. The requesting party then places a video call to that agent, using a completely different communication channel from that used to contact the server.

Two, the server, through the network, notifies the selected agent that a video call is to be expected. The agent then blocks out other incoming calls, to thereby keep a communication channel free to accept the expected video call.

Invention in Greater Detail

Figure 2:
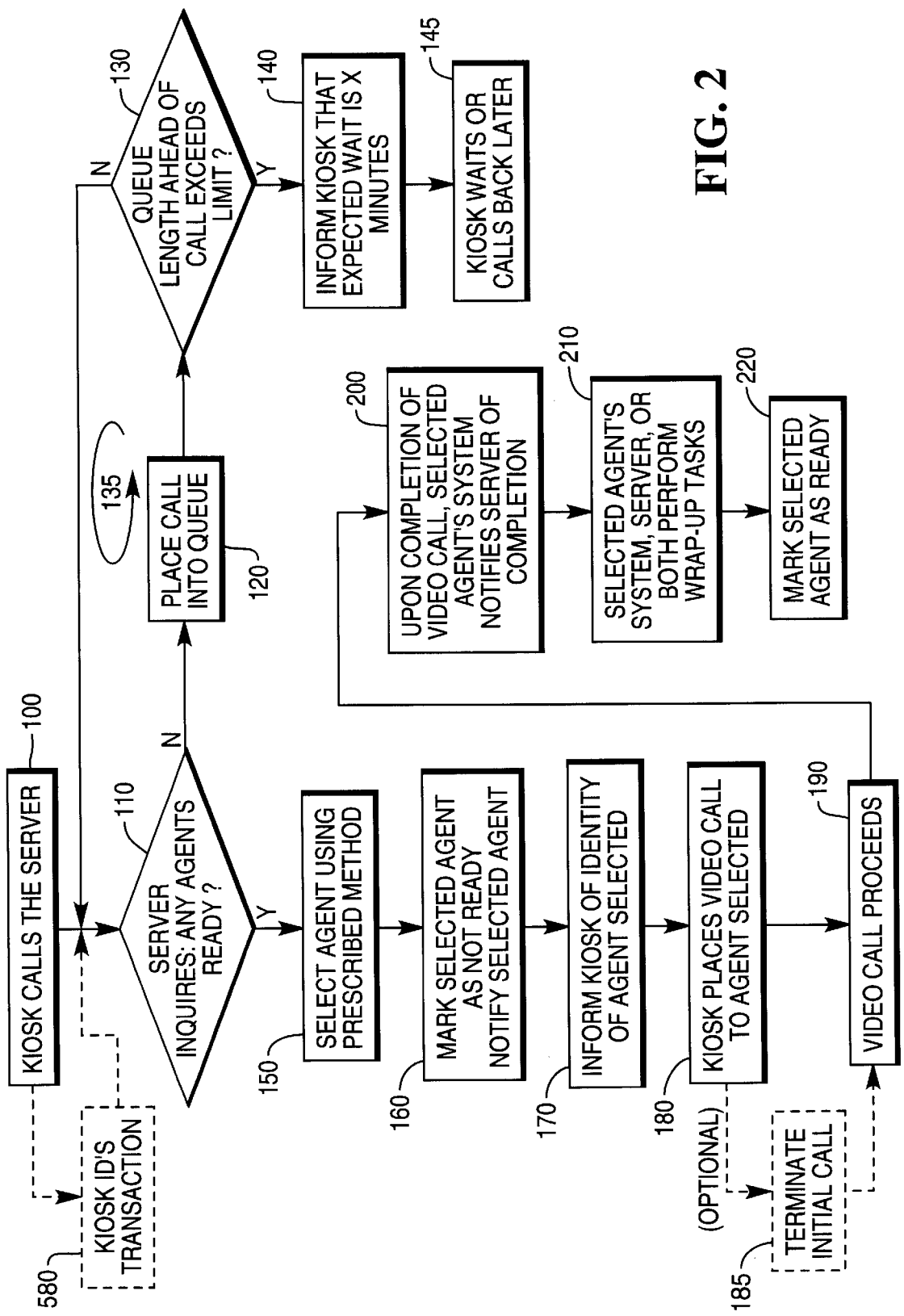
FIG. 2 is a flow chart of logic executed by the invention.

FIG. 2 is a flow chart illustrating logic undertaken by the invention in executing the steps just described.

Block 100 of FIG. 2 indicates that a kiosk places a call to a server, using a telephone line or other appropriate communication link. Kiosks are stations located remote from the server. Four kiosks 101 are illustrated in FIG. 3A, together with a server 105. The call is placed, for example, by a computer 102 located at kiosk 1, using an appropriate communication channel, such as an ordinary telephone channel, and preferably using the protocol known as TCP/IP, which is an acronym for "Transmission Control Protocol/Internet Protocol".

The kiosks can take the form of Automated Teller Machines, ATMs, which are equipped with video conferencing equipment, which is contained within, and associated with computers 102. Alternately, independent computers, not associated with kiosks, can perform the functions described herein. One such ATM is described in U.S. Pat. No. 5,604,341, issued on Feb. 18, 1997, Ser. No. 403,145, in which the named inventor is Grossi, and in which the assignee is AT&T Global Information Solutions Company. A video conferencing system usable by the ATM is described in U.S. Pat. No. 5,608,872, issued on Mar. 4, 1997, Ser. No. 34,313, in which the named inventor is Schwartz, and in which the assignee is NCR Corporation. Both of these patents are hereby incorporated by reference.

In FIG. 3A, LINK 1 represents the communication channel used by the kiosk 1 to contact the server 105. Upon receiving this call, the server 105, in block 110 in FIG. 2, inquires whether any agents 108 in FIG. 3A are ready to accept video calls.

If the answer is negative, as can occur when all agents are busy, block 120 is reached in FIG. 2, wherein the incoming call is placed into a waiting queue.

Then, block 130 inquires whether the length of the queue ahead of the incoming call exceeds a limit. If so, an unacceptable delay may be imposed upon the calling party, so block 140 informs the calling kiosk of the length of the expected delay. The calling kiosk either accepts the delay and waits, as indicated in block 145, or repeats the attempt to place the call at a later time. If, in block 130, the queue ahead of the incoming call does not exceed the limit, indicating that any delay occurring will be acceptable, then the logic returns to block 110.

One summary of the queue-handling just described is that if the number of calls preceding the incoming call is "small," so that no significant delay will occur, the logic idles in loop 135 until the queue ahead of the incoming call disappears. At this time an agent becomes ready to accept the incoming call. When an agent becomes ready, the logic exits loop 135, and reaches block 150.

In block 150, one of the agents who is free is selected. The "prescribed method" of block 150 refers to the fact that different methods can be used to select an agent, when more than one agent is free. For example, an agent can be selected randomly. As other examples, an agent can be selected based on a) length of time each agent has been idle,
b) the fraction of time each agent has been occupied with calls; or
c) skill level of each agent.

After an agent is selected, the server, in block 160, marks that agent as no longer ready to accept calls, because that agent has just been selected to receive the incoming call. This marking takes place in a status table, discussed later. In addition, the agent is notified of the fact of selection, so that the agent can take any necessary steps to prepare for the video call.

One important reason for notifying the agent is that, as will be seen shortly, a brief delay will occur, prior to actual receipt of the video call by the agent. If the agent were not notified, then, during the delay, the agent may become occupied with another task, which may interfere with the video call, especially if that task involves the computer system which will be used by the agent in handling the forthcoming video call. Informing the agent of the impending video call will prevent such interference.

Next, in block 170, the call center informs the calling kiosk of the identify of the agent selected. If the calling kiosk is already equipped with a telephone number for each agent, then the identity of the selected agent is sufficient to allow the kiosk to call the selected agent. Otherwise, the appropriate telephone number is transmitted to the kiosk.

In block 180, a computer 102 in FIG. 3A within the calling kiosk places a video call by dialing the telephone number of the selected agent. This video call uses a different channel than LINK 1 shown in FIG. 3A. The different channel can be a high data rate channel, such as that commercially available under the name ISDN: Integrated Services Digital Network. This different channel is illustrated in FIG. 3B as LINK 2.

As block 185 in FIG. 2 indicates, at this time, the initial call, made on LINK 1, may be terminated. (This call can take the form of a TCP/IP connection over a Wide Area Network, WAN.) However, termination may not be desired: reasons may exist for maintaining the initial call during the subsequent video conference. One reason is that the server 105 in FIG. 3A may take the form of an ACD, which has been modified to perform the steps described herein, in addition to its usual call-routing functions.

Many types of ACD are designed to maintain logs of the time, duration, and parties involved in all calls handled by the ACD. If the initial call were terminated in block 185, then the ACD would merely log a short call to the selected agent. But such a log entry would not accurately indicate the activity of the selected agent, because the selected agent will immediately become occupied by a longer video call, without the knowledge of the ACD. To provide a more accurate log, the initial call may be maintained for the duration of the subsequent video call, rather than being terminated in block 185.

In block 190 in FIG. 2, the video call proceeds. Upon completion of the video call, the computer of the selected agent, in block 200, notifies the server 105 in FIG. 3. In block 210, the computer of the selected agent, as well as the server, perform any necessary wrap-up tasks. Such task can include logging the preceding activity, and other related endeavors.

Next, in block 220, the call center 105 marks the selected agent as ready to accept subsequent video calls.

The preceding discussion explains a system wherein an incoming call from a kiosk acts as a request for a video conference. A server selects an agent to participate in the requested video conference, and identifies the selected agent to the kiosk. The kiosk then places a video call, independent of the first call, to the selected agent. During the same general time that the logic of FIG. 2 is undertaken, the logic of FIG. 4 also runs. This logic continually updates a status table ST with the status of each agent. As the status table shows, each agent is indicated as either being available, or not available. In addition, if the agent is not available, the table indicates when the agent will later become available.

For example, when an agent leaves the workplace at the end of the working day, that agent may inform the call center that the agent has become unavailable, and will next become available in 24 hours, as agent C has done in the STATUS TABLE.

As another example, when an agent arrives for duty, the agent informs the call center that the agent is now available, as agent A has done. As a third example, if an agent takes a break, the agent may inform the call center that the agent will return in ten minutes, as agent B has done.

Blocks 300 and 310 represent the steps undertaken in maintaining the status table in an accurate condition. As explained above, the status table is used to locate an available agent, when a request for a video conference arrives. In addition, when an agent is selected for a video conference, the server making the selection marks the agent's status as "not ready" in the status table.

Additional Considerations

Figure 5:
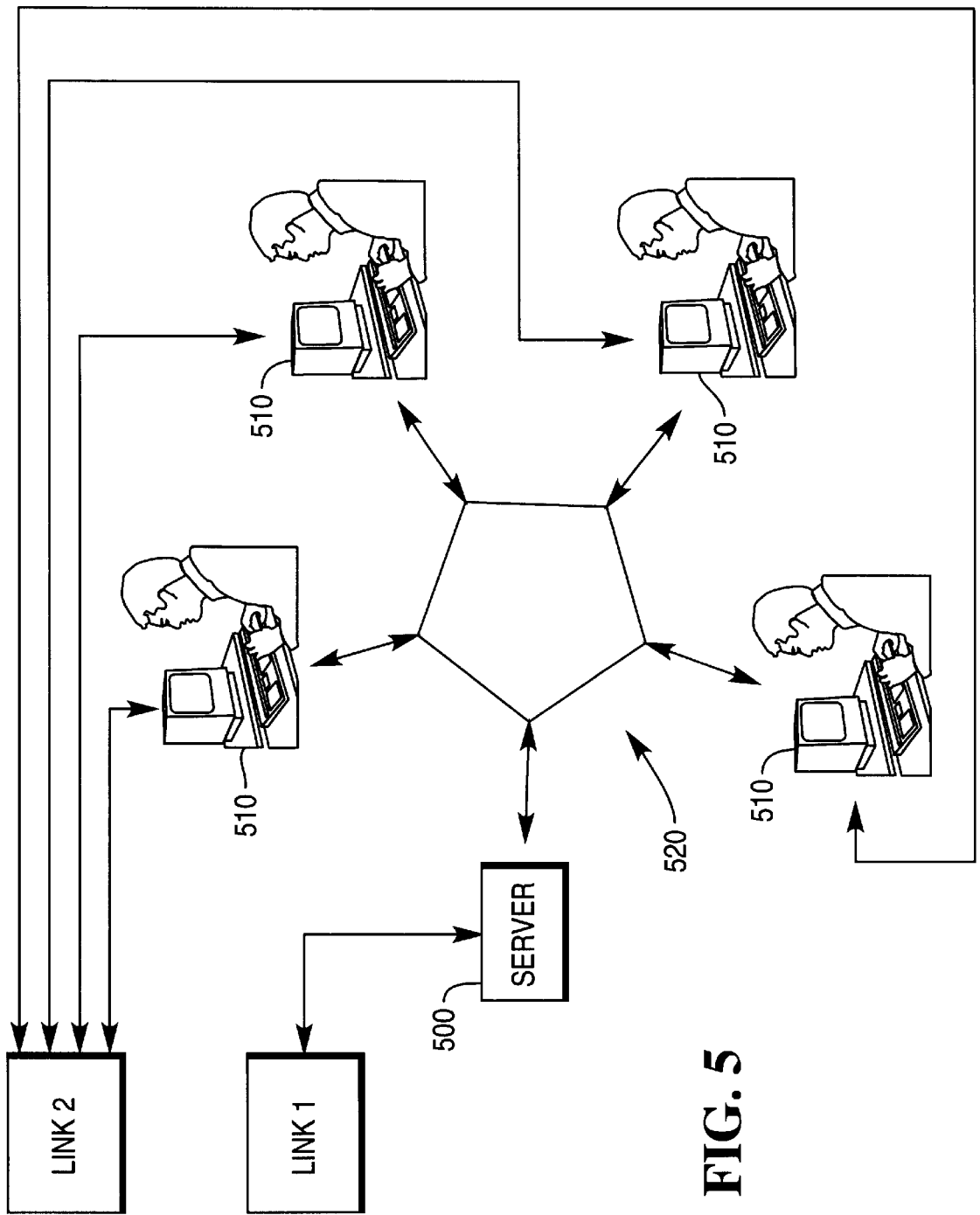
FIG. 5 illustrates an architecture used to implement one form of the invention.

1. FIG. 5 illustrates one architecture which can implement the invention.

Computers 510 are connected to a network 520, to which server 500 is also connected. The network 520 is used by the server 500 to notify the selected agent, as in block 160 in FIG. 2. The computers 510 communicate with the server 500, as in block 300 in FIG. 4.

Each computer 510 is connected to a LINK 2, which can take the form of ISDN channels, as described above. Each LINK 2 carries the video calls placed by the kiosks of FIG. 3A. LINK 1, which connects to the server 500, carries the initial call of block 100 in FIG. 2, as well as the identification information of block 160.

The arrangement of FIG. 5 allows a video call distribution function to be retro-fitted into an existing computer network. Such retro-fitting eliminates any requirement to purchase a video ACD to attain video call distribution.

Figure 1:
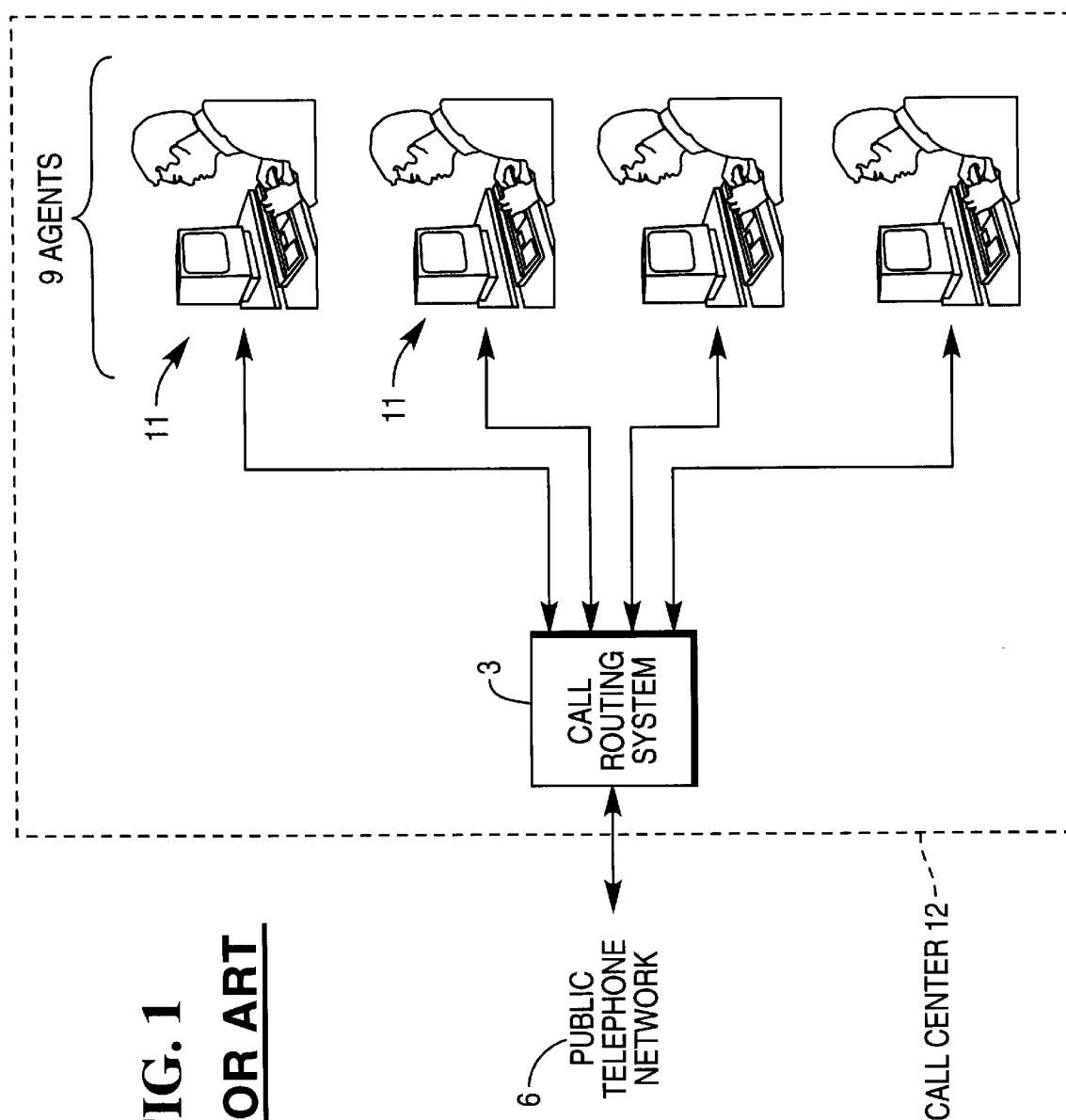
FIG. 1 illustrates a prior-art call center 12.
Figure 6:
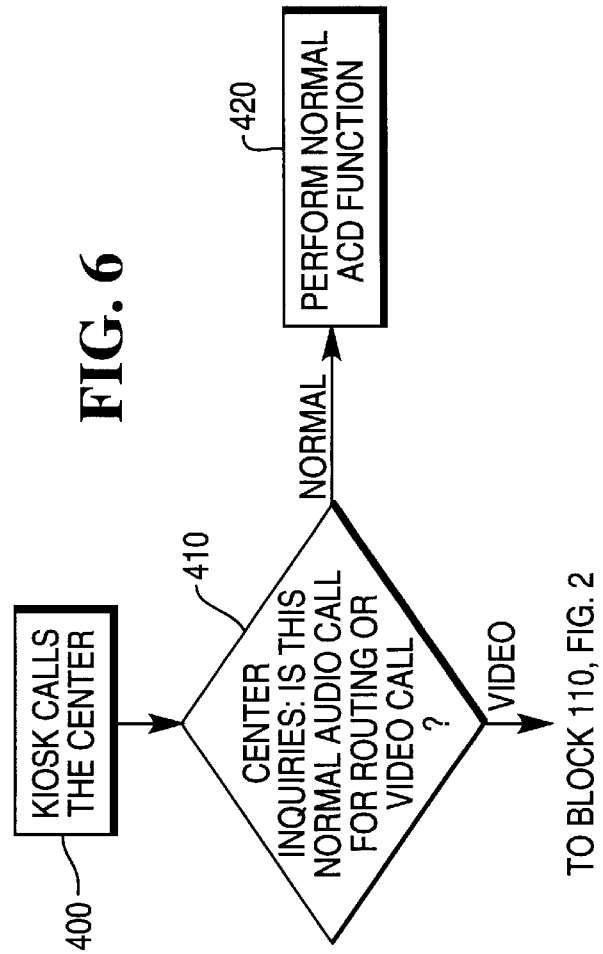
FIG. 6 illustrates logic implemented in another form of the invention.

2. The invention can operate side-by-side with an ordinary ACD, of the type shown in FIG. 1. For example, in FIG. 6, a kiosk calls the ACD, as indicated in block 400. The ACD then inquires whether the call is a normal audio call, or a request for a video call. If a normal call is received, block 420 is reached, which routes the call to an agent in the normal manner. If a video call is being requested, the logic is routed to block 110 in FIG. 2, as indicated, and, in effect, a video call is routed to a selected agent.

The logic of FIG. 2, together with other required steps, are performed by the processor already contained within the ACD.

This mode of operation may require that the ACD be equipped with generic server capabilities. Some are not.

3. FIG. 7 illustrates an exemplary sequence of events undertaken by the invention. In FIG. 7A, KIOSK 1 in FIG. 3A calls the server 500, using LINK 1, as indicated by dashed line 560 in FIG. 7A. The server 500 locates an available agent in status table 550, and informs KIOSK 1 of the identity of this agent. Then, in FIG. 7B, KIOSK 1 places a video call directly to the available agent, using LINK 2, as indicated by dashed line 570.

Figure 4:
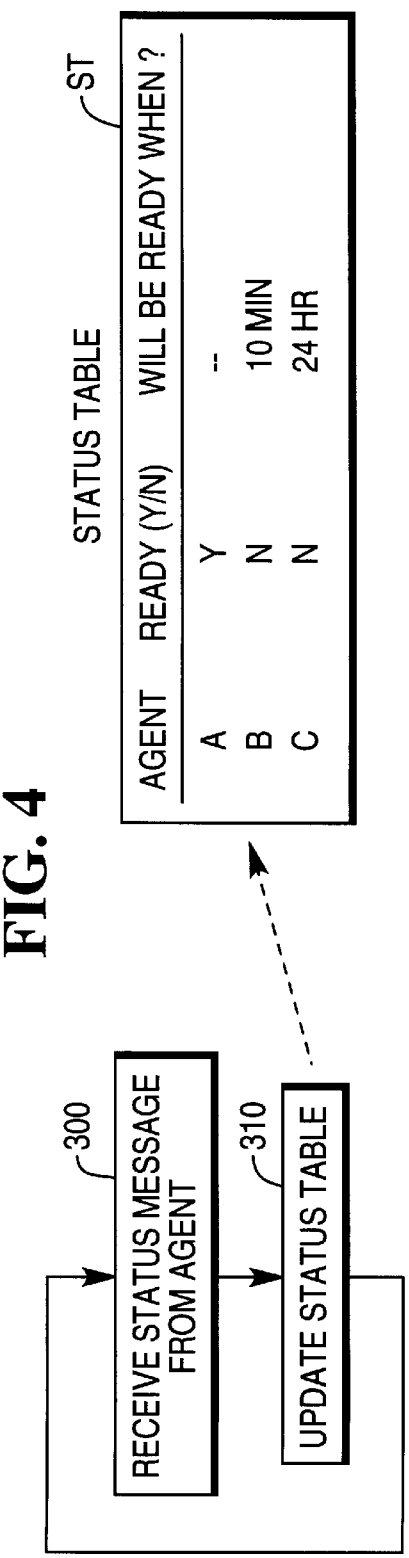
FIG. 4 illustrates logic implemented by the invention in updating a status table.

4. The status table of FIG. 4 is not strictly necessary. The server 105 in FIG. 3A can interrogate each agent's computer directly, in search of an available agent.

5. Agents may be classified into groups. For example, assume that the server 500 in FIG. 5 is located at a financial institution. One group of agents may handle residential mortgages, another group may handle automobile loans, and so on. When a kiosk of FIG. 3 calls the server 500 in FIG. 5, the kiosk identifies the type of transaction involved, such as a residential mortgage transaction, as indicated in optional block 580 in FIG. 2. In response to this identification, the agent selected in block 150 is selected from the group of agents responsible for residential mortgages, and not from a general agent pool.

In one embodiment, if all agents in the relevant group are busy, then an agent from a related group is selected.

6. The server 105 in FIG. 2, server 500 in FIG. 5, and the dual-purpose ACD mentioned in FIG. 6 all contain digital processors, which run computer programs which control system operation. The servers 105 and 500, of course, can take the form of general-purpose, programmable digital computers.

7. A significant difference in the bandwidths of LINK 1 and LINK 2 exists. LINK 2 is a high-bandwidth channel, capable of supporting full-motion video, plus audio. ISDN channels can be used for LINK 2. One type of ISDN channel carries 128,000 bits (not bytes) per second. In contrast, LINK 1 carries much less information. An ordinary telephone channel can be used, which carries about 16,000 bits per second.

A cut-off can be defined for the data rates of the two LINKs, with the data rate of LINK 1 less than the cut-off, and that of LINK 2 greater than the cut-off. Suitable cut-offs are 10,000; 25,000; 50,000; and 100,000 bits per second.

8. Kiosks were described above, which contain computers. However, kiosks are not strictly necessary. The computers, or equivalent devices, can stand by themselves, or even be portable.

Numerous substitutions and modifications can be undertaken without departing from the true spirit and scope of the invention. What is desired to be secured by Letters Patent is the invention as defined in the following claims.

What is claimed is:

1. A method of operating a kiosk, comprising the following steps:
   a) requesting, on a first channel, that a remote station identify an agent who is available for a video conference and,
   b) receiving identity of the agent; and
   c) placing, on a second channel having a data capability exceeding 100,000 bits per second, a call from the kiosk which establishes a video conference with the agent identified.

2. Method according to claim 1, in which the kiosk comprises an automated teller machine.

3. Method according to claim 1, and further comprising the step of notifying the agent who is identified, prior to placement of the call on the second channel, of the forthcoming call from the kiosk which will establish the video conference.

4. Method according to claim 1, in which (A) the remote station comprises a group of computers networked together, and (B) one of the computers is involved in the video conference.

5. Method according to claim 1, and further comprising the step of undertaking no communication on the first channel, during the video conference.

6. Method according to claim 1, wherein the first channel comprises a POTS call, and the POTS call is terminated after the agent is identified.

7. A kiosk, comprising:
   a) a computer;
   b) apparatus for holding a video conference; and
   c) program means, for running on the computer, for
      i) contacting a remote station;
      ii) receiving identity of an available video conferencing station; and
      iii) placing a video call on a data channel having a capacity exceeding 100,000 bits per second to said video conferencing station.

8. Apparatus according to claim 7, wherein the kiosk comprises an automated teller machine.

9. A method of operating a group of computers networked together, comprising the following steps:
   a) maintaining video conferencing capability in the computers;
   b) receiving an inquiry from a caller on a first channel;
   c) identifying an available computer to the caller; and
   d) using the identified computer, accepting an incoming call from the caller and holding a video conference on that computer with the caller using a second channel exclusively.

10. Method according to claim 9, wherein the second channel can carry data at about 128,000 bits per second, or greater.

11. Method according to claim 10, wherein the first channel can carry data at about 50,000 bits per second, or less.

12. Method according to claim 9, wherein the second channel can carry data at over 50,000 bits per second, and the first channel can carry data at less than 50,000 bits per second.

13. Method according to claim 9, and further comprising the step of undertaking no communication on the first channel, during the video conference.

14. Method according to claim 9, wherein the first channel comprises a POTS call, and the POTS call is terminated after the available computer is identified.

* * * * *